(12) United States Patent
Wong et al.

(10) Patent No.: US 11,309,929 B2
(45) Date of Patent: Apr. 19, 2022

(54) OUTPUT POWER ADJUSTMENTS BASED ON SENSORS

(71) Applicant: Hewlett-Packard Development Company, L.P., Spring, TX (US)

(72) Inventors: Simon Wong, Spring, TX (US); Shih-Huang Wu, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/978,728

(22) PCT Filed: Jun. 22, 2018

(86) PCT No.: PCT/US2018/038977
§ 371 (c)(1),
(2) Date: Sep. 7, 2020

(87) PCT Pub. No.: WO2019/245579
PCT Pub. Date: Dec. 26, 2019

(65) Prior Publication Data
US 2021/0367637 A1    Nov. 25, 2021

(51) Int. Cl.
| H04B 1/3827 | (2015.01) |
| H04W 52/24 | (2009.01) |
| H04W 52/28 | (2009.01) |
| H04W 52/36 | (2009.01) |

(52) U.S. Cl.
CPC ........ *H04B 1/3838* (2013.01); *H04W 52/246* (2013.01); *H04W 52/282* (2013.01); *H04W 52/283* (2013.01); *H04W 52/285* (2013.01); *H04W 52/367* (2013.01)

(58) Field of Classification Search
CPC . H04B 1/3838; H04B 1/3827; H04W 52/246; H04W 52/282
USPC .................... 455/67.11, 550.1, 522, 69, 90.3
See application file for complete search history.

(56) References Cited

U.S. PATENT DOCUMENTS

| 8,417,296 | B2 | 4/2013 | Caballero et al. |
| 8,886,247 | B1 | 11/2014 | Price et al. |
| 9,307,499 | B2 | 4/2016 | Zehr et al. |
| 9,531,420 | B1 | 12/2016 | Prendergast et al. |
| 9,723,434 | B1 | 8/2017 | Chang et al. |
| 9,813,997 | B2 | 11/2017 | Mercer et al. |
| 9,854,540 | B2 | 12/2017 | Sun |
| 9,929,763 | B1 | 3/2018 | Zheng et al. |
| 2008/0167834 | A1* | 7/2008 | Herz ............ G06F 1/3231 702/150 |
| 2009/0305742 | A1 | 12/2009 | Caballero et al. |

(Continued)

FOREIGN PATENT DOCUMENTS

| CN | 102089989 A | 6/2011 |
| CN | 106034351 A | 10/2016 |

(Continued)

*Primary Examiner* — John J Lee
(74) *Attorney, Agent, or Firm* — HPI Patent Department

(57) ABSTRACT

An example electronic device includes a wireless communication component and a controller. The controller is to set an output power of the wireless communication component based on: whether a first external object is in proximity to a first side of the electronic device; whether the electronic device is stationary; and whether a second external object is in proximity to a second side of the electronic device, where the second side is opposite to the first side.

14 Claims, 5 Drawing Sheets

(56) References Cited

U.S. PATENT DOCUMENTS

| | | |
|---|---|---|
| 2011/0006190 A1 | 1/2011 | Alameh et al. |
| 2011/0059706 A1* | 3/2011 | Harel .................. H04B 1/3838 |
| | | 455/115.1 |
| 2012/0084834 A1 | 4/2012 | Brown et al. |
| 2012/0133956 A1* | 5/2012 | Findlay ................ H01L 31/125 |
| | | 356/614 |
| 2013/0030589 A1 | 1/2013 | Pessina et al. |
| 2014/0315592 A1 | 10/2014 | Schlub et al. |
| 2014/0364162 A1 | 12/2014 | Juang et al. |
| 2016/0365886 A1 | 12/2016 | Prendergast |

FOREIGN PATENT DOCUMENTS

| | | |
|---|---|---|
| EP | 2992612 A2 | 3/2016 |
| WO | 2014/178970 A2 | 11/2014 |

\* cited by examiner

| Second Proximity Sensor | Movement Sensor | First Proximity Sensor | Output Power |
|---|---|---|---|
| Ignore | Active | Active | Low |
| Ignore | Ignore | Inactive | High |
| Active | Inactive | Active | Low |
| Inactive | Inactive | Active | High |

*FIG. 4*

OUTPUT POWER ADJUSTMENTS BASED ON SENSORS

BACKGROUND

The ability to perform communication wirelessly is an important aspect of mobile electronic devices, such as notebook computers, tablet computers, smart phones, etc. During wireless communication, an electronic device may emit radio frequency (RF) energy that may be absorbed by tissues of a user of the electronic device. High level of RF energy absorption may cause harm to the user.

BRIEF DESCRIPTION OF THE DRAWINGS

Some examples of the present application are described with respect to the following figures:

FIG. 4 illustrates a lookup table to determine an output power of a wireless communication component based on outputs from a plurality of sensors, according to an example.

DETAILED DESCRIPTION

Figure 1:
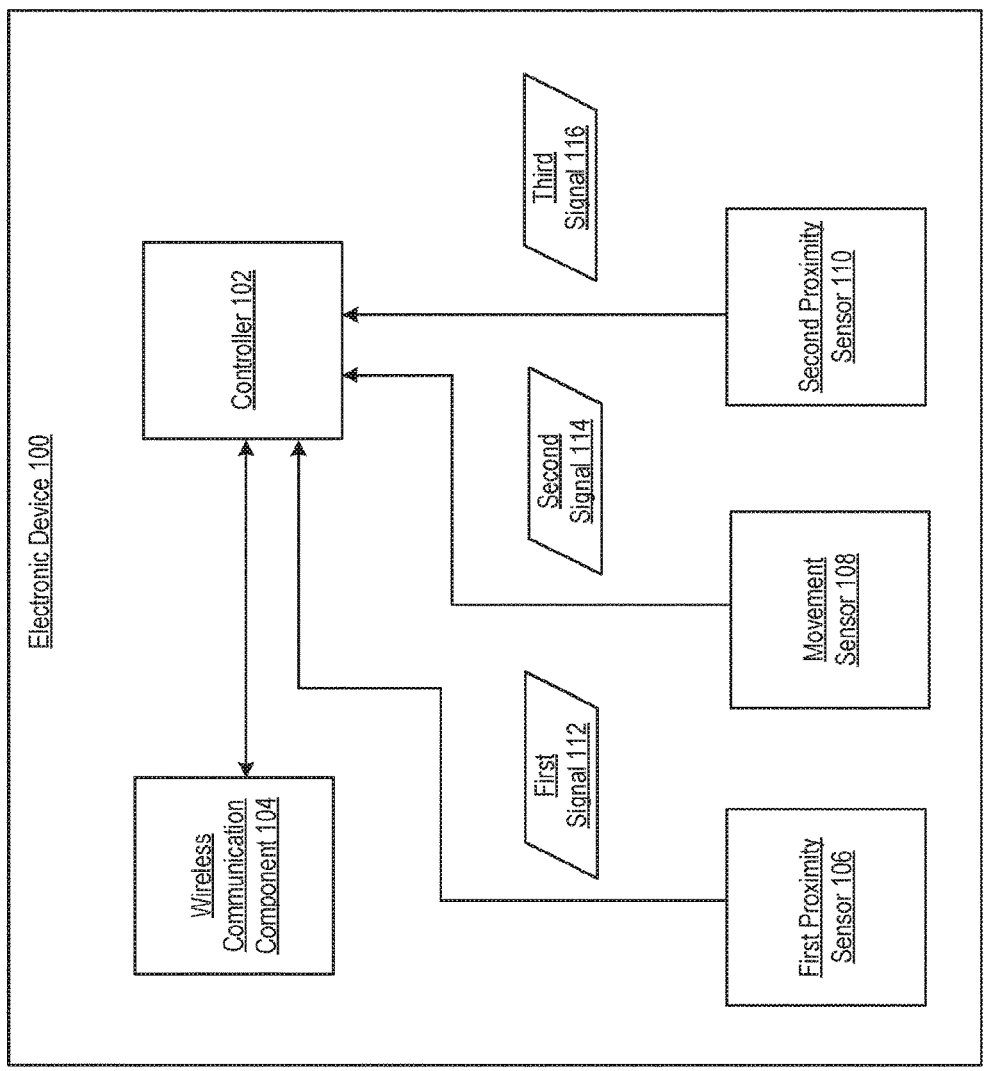
FIG. 1 illustrates an electronic device to set an output power of a wireless communication component based on a plurality of sensors, according to an example.

Governmental regulation agencies in various countries have set limits to radio frequency (RF) energy emission from an electronic device. The limits may be defined in terms of the electronic device's specific absorption rate (SAR). The SAR is a measure of the rate at which energy is absorbed by the human body when exposed to a radio frequency electromagnetic field. For example, in the United States, the SAR limit for public exposure to RF energy from an electronic device is 1.6 watts per kilogram (1.6 W/kg). To comply with SAR regulations, an electronic device may reduce RF output power of the communication components (e.g., wireless transceivers, wireless communication components) when the electronic device is within a certain distance to a user of the electronic device. The electronic device may use a proximity sensor to determine the distance. However, in some situations, using the proximity sensor alone may produce a false detection (e.g., the electronic device is resting on a table, but the user is not close to the electronic device) and the output power may still be reduced.

Examples described herein provide an approach to dynamically adjust an output power of a communication component of an electronic device based on outputs from a plurality of sensors. In an example, an electronic device may include a wireless communication component. The electronic device may also include a controller to set an output power of the wireless communication component based on: whether a first external object is in proximity to a first side of the electronic device; whether the electronic device is stationary; and whether a second external object is in proximity to a second side of the electronic device, where the second side is opposite to the first side.

In another example, an electronic device may include a first proximity sensor to generate an active output in response to detecting a presence of an external object in proximity to the electronic device. The electronic device may also include a movement sensor. The electronic device may further include a second proximity sensor positioned in the electronic device to have a different sensing direction than the first proximity sensor. The electronic device may further include a wireless communication component. The electronic device may further include a controller to reduce an output power of the wireless communication component in response to detecting an assertion of the signal. While the output is active, the controller may also adjust the output power based on outputs from the movement sensor and the second proximity sensor.

In another example, a non-transitory machine-readable storage medium may include instructions that when executed cause a controller of an electronic device to reduce an output power of a wireless communication component of the electronic device in response to detecting an active output from a first proximity sensor of the electronic device. While the output is active, the instructions may cause the controller to: determine whether the electronic device is stationary based on an output from a movement sensor of the electronic device; in response to a determination that the electronic device is stationary, determine whether an output from a second proximity sensor of the electronic device is active; in response to a determination that the output from the second proximity sensor is inactive, increase the output power. Thus, examples described herein may reduce the frequency of unwarranted wireless communication component output power reductions.

FIG. 1 illustrates an electronic device 100 to set an output power of a wireless communication component based on a plurality of sensors, according to an example. Electronic device 100 may include a controller 102, a wireless communication component 104, a first proximity sensor 106, a movement sensor 108, and a second proximity sensor 110.

Electronic device 100 may be, for example, a notebook computer, a tablet computing device, a detachable notebook computer, a convertible notebook computer, a 2-in-1 notebook computer, a mobile phone, an electronic book reader, a wearable device, or any other electronic device able to communicate with another device wirelessly. Controller 102 may be, for example, a semiconductor-based microprocessor, and/or other hardware devices (e.g., a Field-Programmable Gate Array (FPGA)) suitable for retrieval and execution of instructions stored in a computer-readable storage medium. Controller 102 may control operations of wireless communication component 104. In some examples, controller 102 may also control operations of electronic device 100. In some examples, controller 102 may be integrated with wireless communication component 104.

Wireless communication component 104 may be a device having circuitry and/or controller executable instructions to transmit and/or receive signals via electromagnetic waves. In some examples, wireless communication component 104 may be a wireless transmitter. In some examples, wireless communication component 104 may be a wireless transmitter and receiver combination (e.g., a transceiver). Wireless communication component 104 may transmit signals using a plurality of communication protocols, such as Institute of Electrical and Electronics Engineers (IEEE) 802.11a, IEEE 802.11b, IEEE 802.11g, IEEE 802.11n, other members in the IEEE 802.11 family, Long-Term Evolution (LTE), Global System for Mobile (GSM), Code-Division Multiple Access (CDMA), Orthogonal Frequency-Division Multiplexing (OFDM), etc.

Proximity sensors 106 and 110 may each be a device to detect the presence of a nearby object without any physical contact. In some examples, proximity sensors 106 and 110 may each include unique processing circuitry that converts information indicating the presence of an object to a format suitable for processing by another device. The processing circuitry may also provide information about the presence of the object to another device, such as controller 102.

Proximity sensors 106 and 110 may detect external objects using different technologies. For example, proximity sensors 106 and 110 may detect the objects using an electromagnetic field, changes in capacitance, changes in optical properties, etc. In some examples, first proximity sensor 106 may be a capacitive proximity sensor and second proximity sensor 110 may be a time-of-flight (ToF) proximity sensor. Movement sensor 108 may be a device that detects physical movements of electronic device 100, such as changes in orientation of electronic device 100, changes in physical space of electronic device 100 (e.g., being carried from one place to another). In some examples, movement sensor 108 may detect the physical movements by measuring proper acceleration experienced by electronic device 100. For example, movement sensor 108 may be implemented using an accelerometer. In some examples, movement sensor 108 may detect the physical movements by measuring the angular velocity experienced by electronic device 100. For example, movement sensor 108 may be implemented using a gyroscope. In some examples, movement sensor 108 may be implemented using a combination of an accelerometer and a gyroscope. Sensors 106, 108, and 110 may be connected to controller 102.

During operation, controller 102 may set an output power of wireless communication component 104. The output power of wireless communication component 104 may be an amount of radio frequency energy that wireless communication component 104 emits during transmission of a signal. In some examples, the output power may be measured in watts.

Controller 102 may set the output power based on whether a first external object is in proximity to a first side of electronic device 100, whether electronic device 100 is stationary, and whether a second external object is in proximity to a second side of electronic device 100. Controller 102 may determine whether a first external object is in proximity to a first side of electronic device 100 based on an output from first proximity sensor 106. Controller 102 may determine whether electronic device 100 is stationary based on an output from movement sensor 108. Controller 102 may determine whether a second external object is in proximity to a second side of electronic device 100 based on an output from second proximity sensor 110.

Controller 102 may initially set the output power to a first value. In some examples, the first value may be greater than an SAR threshold. As used herein, an SAR threshold may be the maximum amount of output power that wireless communication component 104 may produce while complying with an SAR regulation set by a regulation entity (e.g., the United States Federal Communications Commission). Controller 102 may monitor an output from first proximity sensor 106 to adjust the output power. In response to detecting the output is active, controller 102 may reduce the output power from the first value to a second value that is lower than the first value. In some examples, the second value may be less than or equal to the SAR threshold.

First proximity sensor 106 may generate an active output by asserting a first signal 112 to controller 102. First proximity sensor 106 may generate the active output in response to detecting a presence of a first external object that is in proximity to a first side electronic device 100. As used herein, an external object is in proximity to the first side of electronic device 100 when a distance between first proximity sensor 106 and the first external object is within a sensing range of first proximity sensor 106. For example, first proximity sensor 106 may have a sensing range of 1.5 centimeters (CM). Thus, when the first external object is within 1.5 CM of a sensing direction of first proximity sensor 106, first proximity sensor 106 may assert first signal 112. When the first external object is more than 1.5 CM away from the sensing direction of first proximity sensor 106, first proximity sensor 106 may not be able to detect the first external object. Thus, the output of first proximity sensor 106 may be inactive as first proximity sensor 106 may not be able to assert first signal 112. The absence of first signal 112 may indicate the output from first proximity sensor 106 as being inactive. In some examples, the first external object may be a human body part, such as a hand.

In some examples, when the output is active, first proximity sensor 106 may assert first signal 112 as an electrical signal (voltage or current) having a value be greater than or equal to a threshold value. The value may change based on the distance between the external object and first proximity sensor 106. The closer the external object, the higher the value. When the output is inactive, the value may be less than the threshold value. When the output from first proximity sensor 106 is inactive, controller 102 may increase the output power from the second value back to the first value. Thus, the outputs from movement sensor 108 and second proximity sensor 110 may be ignored until the output from first proximity sensor 106 is active again.

While the output from first proximity sensor 106 is still active (i.e., first proximity sensor 106 is still sensing an external object in proximity to electronic device 100), controller 102 may examine an output from movement sensor 108 to further adjust the output power of wireless communication component 104. In response to detecting a movement of electronic device 100, movement sensor 108 may generate an active output by asserting a second signal 114 to controller 102. In response to detecting the active output from movement sensor 108, controller 102 may determine that electronic device 100 is in motion. In response to determining that electronic device 100 is in motion, controller 102 may maintain the output power at the second value, Thus, while the outputs from first proximity sensor 106 and movement sensor 108 are active, controller 102 may ignore the output from second proximity sensor 110.

While the output from first proximity sensor 106 is active, in response to a determination that electronic device 100 is stationary, controller 102 may further adjust the output power based on the output from second proximity sensor 110. Controller 102 may monitor a duration in which the output from movement sensor 108 is inactive (i.e., the absence of second signal 114). When the duration is greater than a threshold (e.g., 5 seconds), controller 102 may determine that electronic device 100 is stationary.

In response to a determination that electronic device 100 is stationary, controller 102 may further adjust the output power based on the output from second proximity sensor 110. Second proximity sensor 110 may operate in a similar manner as first proximity sensor 106. Second proximity sensor 110 may generate an active output by asserting a third signal 116 to controller 102, Second proximity sensor 110 may generate the active output when a second external object is detected in proximity to the second side of electronic device 100. The output from second proximity sensor 110 may be inactive when third signal 116 is absent (e.g., when the second external object is outside the sensing range of second proximity sensor 110). In some examples, the second external object may be a human body part, such as a head.

In response to detecting an active output from second proximity sensor 110, controller 102 may maintain the output power at the second value. In response to detecting an inactive output from second proximity sensor 110, controller 102 may change the output power from the second value back to the first value.

Figure 2A:
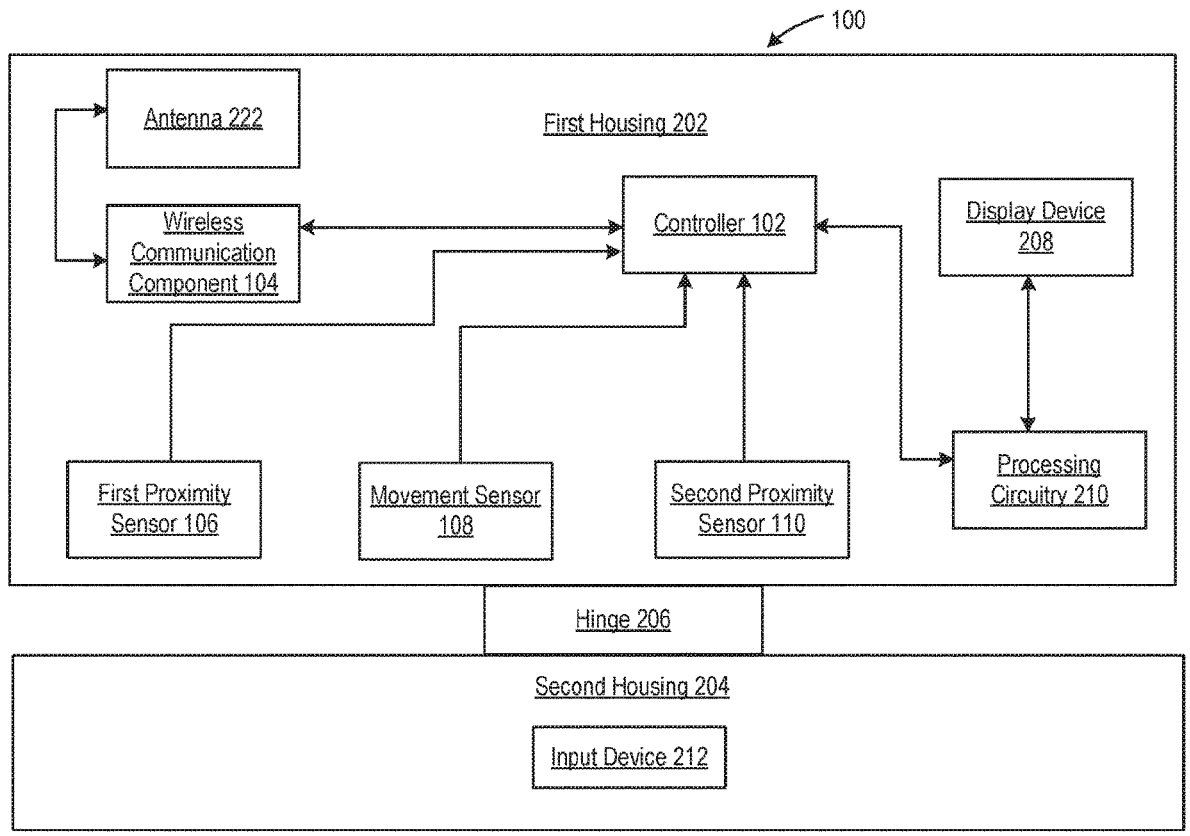
FIG. 2A illustrates an electronic device to set an output power of a wireless communication component based on a plurality of sensors, according to another example.

FIG. 2A illustrates electronic device 100 to set an output power of a wireless communication component based on a plurality of sensors, according to another example. Electronic device 100 may include a first housing 202, a second housing 204, and a hinge 206 that connects first housing 202 to second housing 204. Electronic device 100 may also include controller 102, wireless communication component 104, first proximity sensor 106, movement sensor 108, second proximity sensor 110, a display device 208, processing circuitry 210, an input device 212, and an antenna 222. Controller 102, wireless communication component 104, a display device 208, and processing circuitry 210 may be stored in first housing 202. As described in more detail in FIG. 2B, first proximity sensor 106 and second proximity sensor 110 may be positioned within first housing 202 to have different sensing directions. Display device 208 may be, for example, a liquid-crystal display (LCD), an organic light-emitting diode (OED) display, or any other electronic device that outputs information in pictorial form. In some examples, second housing 204 may be detachable from first housing 202 via hinge 206, Thus, once detached, components stored within first housing 202 may function as a standalone device (e.g., electronic device 100 of FIG. 1).

Processing circuitry 210 may control operations of electronic device 100. For example, processing circuitry 210 may include a processor, such as a central processing unit (CPU), and/or a storage device encoded with instructions executable by the processor. In some examples, processing circuitry 210 may also include controller 102. Thus, processing circuitry 210 may directly control operations of wireless communication component 104 instead of via controller 102. Input device 212 may be an electronic device that provides an interface for a user to enter information. Input device 212, for example, may be a keyboard, a touchpad, a mouse, a stylus, or a combination thereof. Antenna 222 may be connected to wireless communication component 104 to radiate the signal (e.g., in the form of electrical current) supplied by wireless communication component 104 as electromagnetic waves. Antenna 222 may be implemented as dipole antenna, monopole antenna, array antenna, loop antenna, etc.

Figure 2B:
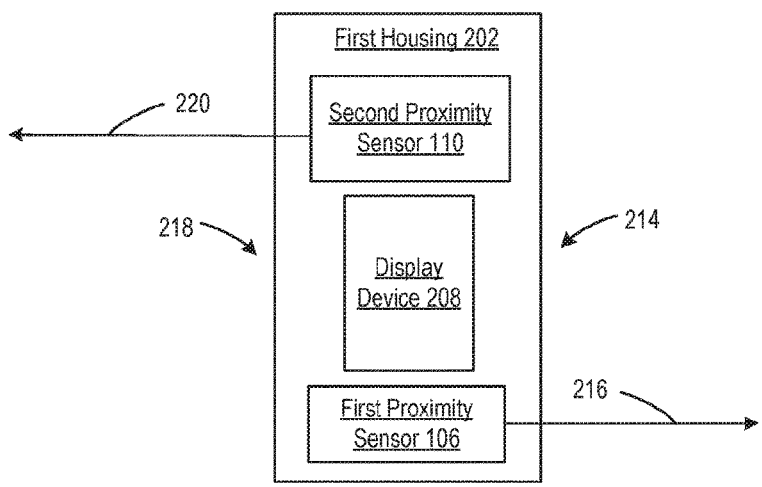
FIG. 2B illustrates the different detection directions of a first proximity sensor and a second proximity sensor of the electronic device of FIG. 2A, according to an example.

FIG. 2B illustrates the different detection directions of first proximity sensor 106 and second proximity sensor 110 of electronic device 100 of FIG. 2A, according to an example. As illustrated in FIG. 2B, first proximity sensor 106 may be positioned in first housing 202 so that a sensing direction of first proximity sensor 106 may be facing away from a first side 214 of first housing 202 (as indicated by an arrow 216). First side 214 may correspond to a side where content/information/data may be shown to a user of electronic device via display device 208. Second proximity sensor 110 may be positioned in first housing 202 so that a sensing direction of second proximity sensor 110 may be facing away from a second side 218 of first housing 202 (as indicated by an arrow 220). First side 214 may be opposite to second side 218. Thus, the sensing direction of first proximity sensor 106 may be opposite to the sensing direction of second proximity sensor 110.

Figure 3:
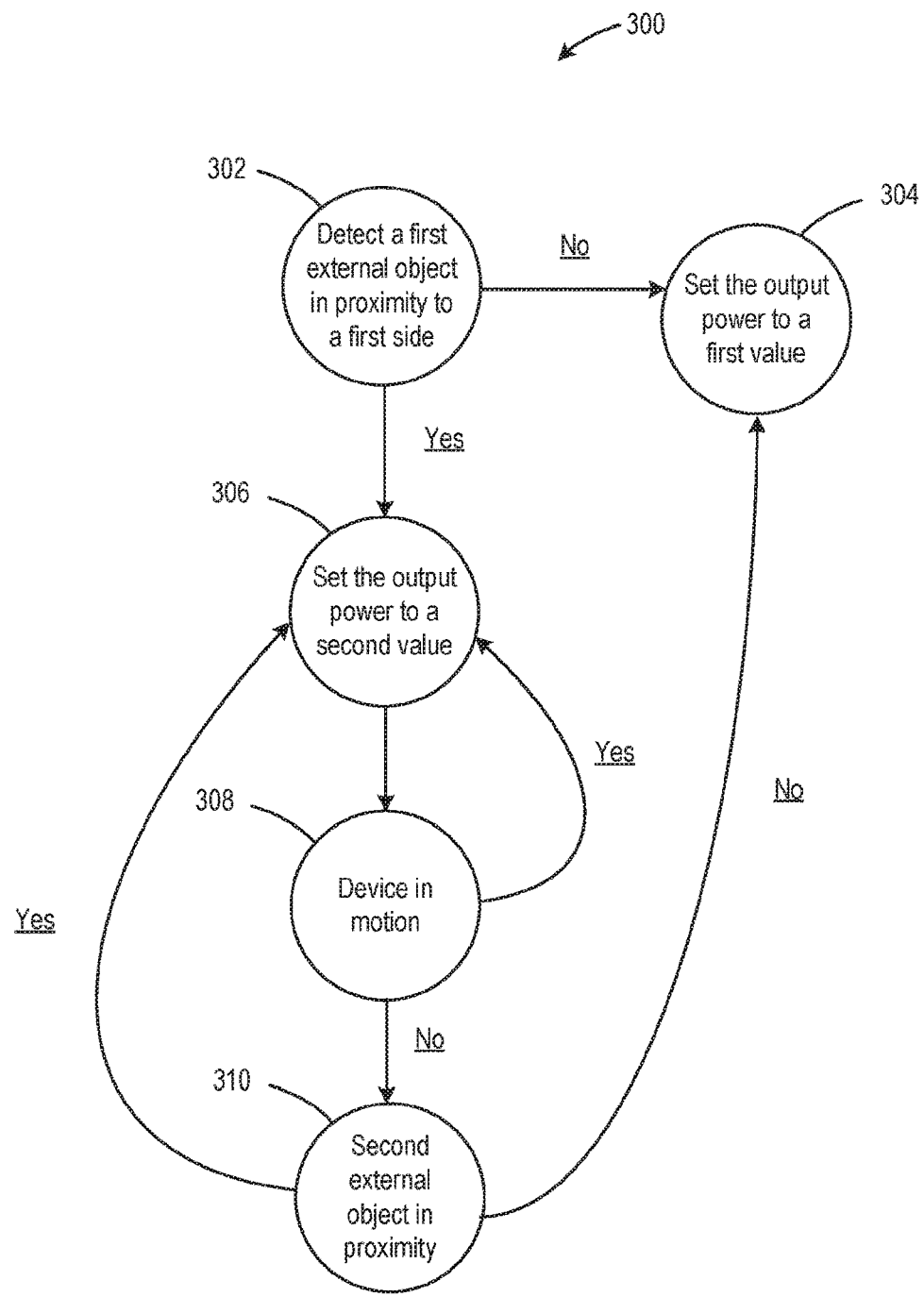
FIG. 3 illustrates a method of operation at an electronic device to set an output power of a wireless communication component based on outputs from a plurality of sensors, according to an example.

FIG. 3 illustrates a method 300 of operation at an electronic device to set an output power of a wireless communication component based on outputs from a plurality of sensors, according to an example. Method 300 may be described with reference to electronic device 100 of FIGS. 1, 2A, and 2B. At 302, controller 102 may determine whether a first external object is detected in proximity to first side 214 of first housing 202 via first proximity sensor 106. At 304, when first proximity sensor 106 is not able to detect the first external object is in proximity to first side 214, controller 102 may not be able to detect an active output from first proximity sensor 106. In response to a determination that the first external object is not in proximity to first side 214, controller 102 may set the output power of wireless communication component 104 to a first value. For example, the first value may correspond to the highest amount of output power that wireless communication component 104 may be able to produce for signal transmission. As another example, the first value may correspond to an amount of output power that is greater than an SAR threshold.

At 306, when first proximity sensor 106 detects the first external object in proximity to first side 214, controller 102 may detect an active output from first proximity sensor 106 via the assertion of first signal 112 from first proximity sensor 106. In response to detecting the assertion of first signal 112, controller 102 may set the output power of wireless communication component 104 a second value by reducing the output power from the first value to the second value. The second value may be lower than the first value. For example, the second value may correspond to an amount of output power that is less than or equal to the SAR threshold.

At 308, subsequent to reducing the output power to the second value and while first signal 112 is still being asserted (i.e., the output from first proximity sensor 106 is still active), controller 102 may determine whether electronic device 100 is in motion via movement sensor 108. When electronic device 100 is in motion (e.g., being moved from one place to another by a user), movement sensor 108 may detect the proper acceleration experienced by electronic device 100 and generate an active output by asserting second signal 114 to controller 102. In response to detecting the assertion of second signal 114, controller 102 may maintain the output power at a current value (i.e., the second value), at 306.

Subsequent to reducing the output power to the second value and while first signal 112 is still being asserted (i.e., the output from first proximity sensor 106 is still active), when controller 102 is not able to detect an active output from movement sensor 108 for a duration greater than a threshold, controller 102 may determine that electronic device 100 is stationary (i.e., not in motion).

At 310, in response to a determination that electronic device 100 is stationary, controller 102 may determine whether a second external object is detected in proximity to second side 218 of first housing 202 via second proximity sensor 110. When second proximity sensor 110 is not able to detect the second external object is in proximity to second side 218, controller 102 may not be able to detect an active output from second proximity sensor 110. In response to a determination that the second external object is not in proximity to second side 218, controller 102 may set the output power of wireless communication component 104 to the first value by increasing the output power from the second value to the first value, at 304. In response to a determination that the second external object is in proximity to second side 218, controller 102 may maintain the output power at a current value (i.e., the second value), at 306.

FIG. 4 illustrates a lookup table 400 to determine an output power of a wireless communication component based on outputs from a plurality of sensors, according to an example. Lookup table 400 may be stored in a storage device of electronic device 100 or may be stored within controller 102. Lookup table 400 may include a plurality of rows to indicate what value the output power of wireless communication component 104 is to be based on the outputs from sensors 106, 108, and 110.

A first row 402 may indicate that the output power is to be set to "low" (e.g., the second value) when the outputs from first proximity sensor 106 and movement sensor 108 are both active. The output from second proximity sensor 110 may ignored by controller 102. That is, controller 102 may set the output power to "low" when the outputs from first proximity sensor 106 and movement sensor 108 are both active regardless of the state of output (active or inactive) from second proximity sensor 110. A second row 404 may indicate that the output power is to be set to "high" (e.g., the first value) when the output from first proximity sensor 106 is inactive. The outputs from movement sensor 108 and second proximity sensor 110 may be ignored by controller 102.

A third row 406 may indicate that the output power is to be set to "low" when the outputs from first proximity sensor 106 and second proximity sensor 110 are active and the output from movement sensor 108 is inactive. A fourth row 408 may indicate that the output power is to be set to "high" when the output from first proximity sensor 106 is active and the outputs from movement sensor 108 and second proximity sensor 110 are inactive.

By utilizing the state of output from second proximity sensor 110 in third and fourth rows 406 and 408, the output power of wireless communication component 104 may be more precisely adjusted in corner cases. The states of outputs from sensors 106, 108, and 110 in third row 406 may correspond to a situation where a user is holding electronic device 100 close to the user. For example, the user's hand is holding the back of electronic device 100 (e.g., first side 214), electronic device 100 is not moving, the user's head is close to the front of electronic device 100 (e.g., second side 218).

The states of outputs from sensors 106, 108, and 110 in fourth row 408 may correspond to a situation where electronic device 100 is resting on a surface (either standalone or docked) or the user is holding the back of electronic device 100 while electronic device 100 is resting or leaning against on a surface.

Figure 5:
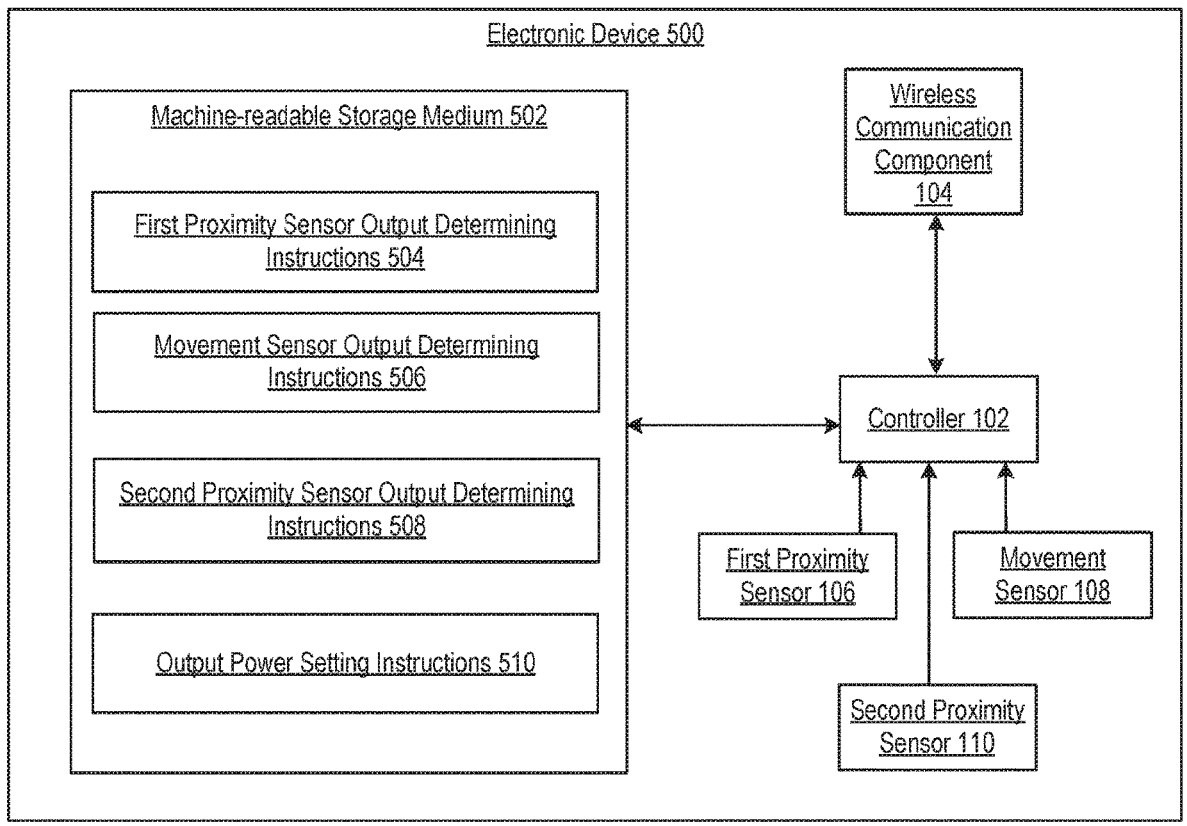
FIG. 5 illustrates an electronic device to set an output power of a wireless communication component based on outputs from a plurality of sensors, according to another example.

FIG. 5 illustrates an electronic device 500 to set an output power of a wireless communication component based on outputs from a plurality of sensors, according to another example. Electronic device 500 may implement electronic device 100 of FIGS. 1, 2A, and 2B.

Electronic device 500 may include controller 102, wireless communication component 104, first proximity sensor 106, movement sensor 108, second proximity sensor 110, and a machine-readable storage medium 502. Machine-readable storage medium 502 may be any electronic, magnetic, optical, or other physical storage device that contains or stores executable instructions. Thus, machine-readable storage medium 502 may be, for example, Random Access Memory (RAM), an Electrically Erasable Programmable Read-Only Memory (EEPROM), a storage device, an optical disc, etc. In some examples, machine-readable storage medium 502 may be a non-transitory storage medium, where the term "non-transitory" does not encompass transitory propagating signals. As described in detail below, machine-readable storage medium 502 may be encoded with a series of processor executable instructions 504, 506, 508, and 510.

First proximity sensor output determining instructions 504 may determine the state of output (e.g., active or inactive) from first proximity sensor 106. For example, referring to FIG. 1, controller 102 may determine that the output from first proximity sensor 106 is active via the assertion of first signal 112 from first proximity sensor 106. In the absence of first signal 112, controller 102 may determine that the output from first proximity sensor 106 is inactive.

Movement sensor output determining instructions 506 may determine the state of output from movement sensor 108. For example, referring to FIG. 1, controller 102 may determine that the output from movement sensor 108 is active via the assertion of second signal 114 from movement sensor 108. In the absence of second signal 114, controller 102 may determine that the output from movement sensor 108 is inactive.

Second proximity sensor output determining instructions 508 may determine the state of output (e.g., active or inactive) from second proximity sensor 110. For example, referring to FIG. 1, controller 102 may determine that the output from second proximity sensor 110 is active via the assertion of third signal 116 from second proximity sensor 110. In the absence of third signal 116, controller 102 may determine that the output from second proximity sensor 110 is inactive.

Output power setting instructions 510 may set the output power of wireless communication component 104 based on outputs from sensors 106, 108, and 110. For example, referring to FIG. 4, controller 102 may use lookup table 400 to set and/or adjust the output power based on the states of outputs from sensors 106, 108, and 110.

The use of "comprising", "including" or "having" are synonymous and variations thereof herein are meant to be inclusive or open-ended and do not exclude additional unrecited elements or method steps.

What is claimed is:
1. An electronic device comprising:
a wireless communication component; and
a controller to:
set an output power of the wireless communication component based on:
whether a first external object is in proximity to a first side of the electronic device;
whether the electronic device is stationary; and
whether a second external object is in proximity to a second side of the electronic device, wherein the second side is opposite to the first side; and
reduce the output power from a first value to a second value in response to detecting that the first external object is in proximity to the first side, wherein the first value is greater than a Specific Absorption Rate (SAR) threshold and the second value is less than or equal to the SAR threshold.

2. The electronic device of claim 1, wherein the controller is set the output power to the first value in response to detecting that:
the first external object is in proximity to the first side;
the electronic device is stationary; and
the second external object is not in proximity to the second side.

3. The electronic device of claim 2, wherein the controller is set the output power to the second value in response to detecting that:
the first external object is in proximity to the first side;
the electronic device is stationary; and
the second external object is in proximity to the second side.

4. The electronic device of claim 2, wherein the controller is set the output power to the first value in response to detecting that:
the first external object is in proximity to the first side; and
the electronic device is in motion.

5. An electronic device comprising:
a first proximity sensor to generate an active output in response to detecting a presence of an external object in proximity to the electronic device;
a movement sensor;
a second proximity sensor positioned in the electronic device to have a different sensing direction than the first proximity sensor;
a wireless communication component; and
a controller to:
reduce an output power of the wireless communication component from a first value to a second value in response to detecting the active output, wherein the first value is greater than a Specific Absorption Rate (SAR) threshold and the second value is less than or equal to the SAR threshold; and
while the output is active:
determine whether the electronic device is stationary based on an output from the movement sensor;
in response to a determination that the electronic device is stationary, determine whether an output from the second proximity sensor is active; and
in response to a determination that the output from the second proximity sensor is inactive, increase the output power.

6. The electronic device of claim 5, further comprising:
a housing; and
a display device stored within the housing, wherein the first proximity sensor, the second proximity sensor, and the movement sensor are stored within the housing, wherein a sensing direction of the first proximity sensor is towards a first side of the housing, and wherein a sensing direction of the second proximity sensor is towards a second side of the housing.

7. The electronic device of claim 6, further comprising:
a second housing detachable from the housing; and
an input device stored within the second housing.

8. The electronic device of claim 5, wherein the second proximity sensor is implemented as a time-of-flight (ToF) sensor.

9. The electronic device of claim 5, wherein the controller is to increase the output power when the output from the first proximity sensor changes from active to inactive.

10. A non-transitory machine-readable storage medium comprising instructions that when executed cause a controller of an electronic device to:
reduce an output power of a wireless communication component of the electronic device from a first value to a second value in response to detecting an active output from a first proximity sensor of the electronic device, wherein the first value is greater than a Specific Absorption Rate (SAR) threshold and the second value is less than or equal to the SAR threshold; and
while the output is active:
determine whether the electronic device is stationary based on an output from a movement sensor of the electronic device;
in response to a determination that the electronic device is stationary, determine whether an output from a second proximity sensor of the electronic device is active; and
in response to a determination that the output from the second proximity sensor is inactive, increase the output power.

11. The non-transitory machine-readable storage medium of claim 10, wherein the instructions when executed further cause the controller to maintain the output power at the second value in response to a determination that the electronic device is in motion.

12. The non-transitory machine-readable storage medium of claim 10, wherein the instructions when executed further cause the controller to:
monitor a duration in which the output from the movement sensor is inactive; and
determine that the electronic device is stationary when the duration is greater than a threshold.

13. The non-transitory machine-readable storage medium of claim 10, wherein the instructions when executed further cause the controller to increase the output power when the output changes from active to inactive.

14. The non-transitory machine-readable storage medium of claim 10, wherein the instructions when executed further cause the controller to maintain the output power at a current value in response to a determination that the output from the second proximity sensor is active.

* * * * *